United States Patent Office.

JOSHUA MERRILL, OF BOSTON, MASSACHUSETTS.

Letters Patent No. 100,652, dated March 8, 1870.

IMPROVED COMPOUND FOR STUFFING LEATHER.

The Schedule referred to in these Letters Patent and making part of the same

*To all whom it may concern:*

Be it known that I, JOSHUA MERRILL, of the city of Boston, in the county of Suffolk, and State of Massachusetts, have invented a new and useful Compound for Stuffing Leather; and I do hereby declare that the following is a full and correct description thereof.

My invention consists in a new stuffing compound, composed of solid paraffine mixed with tallow, fish-oil, rosin, rosin-oil, and tar of commerce, or either of them.

Paraffine, having no tendency to absorb oxygen, acts as an antiseptic, preventing the oxidation of such substances as those above mentioned, and like substances, thereby preventing them from drying or hardening in the pores of the leather.

By "solid paraffine," I mean either the article known in the market as "scale paraffine," or that known as refined paraffine.

A compound composed of thirty-three parts paraffine, thirty-three parts rosin, twenty-four parts rosin-oil, and ten parts rendered tallow, makes a stuffing or dressing for leather of great value, finishing goat and sheep-skins so that they resemble calf-skins. It renders them very soft and pliable, and they finish with a beautiful surface.

This compound also finishes calf-skins equal to the best French calf, and at comparatively small cost, as compared with the high-priced oils usually employed for dressing the finer kinds of leather.

A composition of thirty-three parts paraffine, thirty-three parts rosin, fourteen parts rosin-oil, ten parts North Carolina tar or tar of commerce, and ten parts of tallow or fish-oil, also makes a very valuable compound for stuffing leather.

In manufacturing my paraffine stuffing compound, I use a kettle heated by fire directly applied, or by steam heat, (by means of a double-walled kettle,) such as usually employed in melting glue; into which I first put the paraffine, then the rosin-oil and tallow or fish-oil, with the tar, when used, and heat them until thoroughly melted and heated to about 220° Fahrenheit.

I now add rosin of good quality in small amounts, constantly stirring until I add the whole quantity to be used, and continue the heat and stirring till all is melted.

I then allow it to rest until it is clear and bright, when it is ready to be put in packages for use, if the operation has been properly conducted.

The paraffine stuffing compound thus made will be clear and bright, and when rubbed between the fingers will be soft and unctuous like a very thick fatty matter. When cold, it is of the consistency of very solid fatty matter, and is removed from the package by scraping it.

I am aware that solid fats, like tallow or tallow and tar of commerce, also rosin-oil mixed with rosin, have been used for stuffing leather, the mixture of tar and rosin and rosin-oil giving greater consistency to the tallow, and such combinations answer a good purpose, but are apt to become hard in time, and make the leather to which they are applied dry and stiff, whereas, the paraffine compound I use causes the leather to remain soft and pliable for a long time.

I do not wish to confine myself to the exact proportions of paraffine, rosin, rosin-oil, tar, and tallow, or fish-oil above given, for I find I can vary the proportions considerably, with good results.

In some cases I use as much as fifty parts rosin, but I find that a less proportion than twenty-five per cent., by weight, of paraffine is not so reliable and valuable as a stuffing compound, as it loses when mixed less than twenty-five per cent., its antiseptic power in a considerable degree.

I claim the paraffine stuffing compound for stuffing leather, composed of solid paraffine mixed with rosin-oil, tallow, or fish-oil, and rosin or tar of commerce, substantially as specified.

JOSHUA MERRILL.

Witnesses:
   CHAS. H. PLIMPTON,
   DAVID DUNLAP.